April 23, 1929.  C. J. HANIMAN  1,710,257
TIE MEMBER FOR FURNACE WALLS
Filed July 29, 1925  2 Sheets-Sheet 1
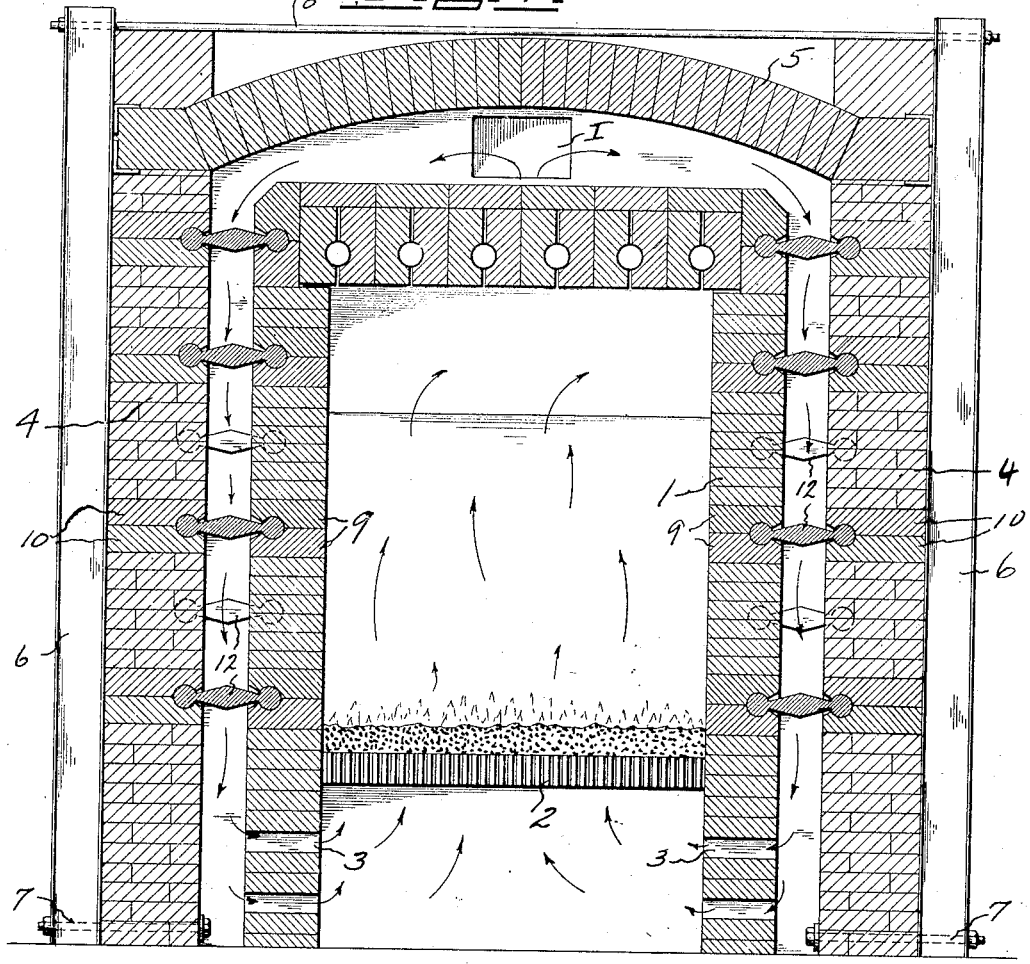
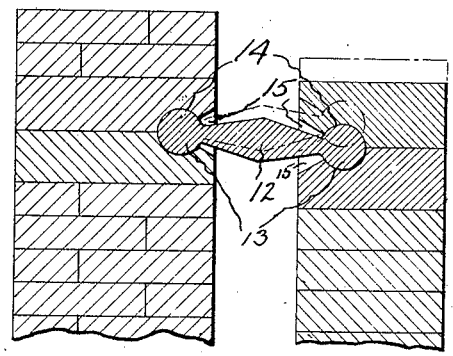
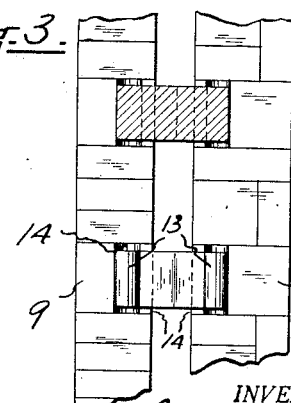
INVENTOR.
Charles J. Haniman
BY Gifford & Scull
ATTORNEYS.

April 23, 1929.  C. J. HANIMAN  1,710,257
TIE MEMBER FOR FURNACE WALLS
Filed July 29, 1925  2 Sheets-Sheet 2
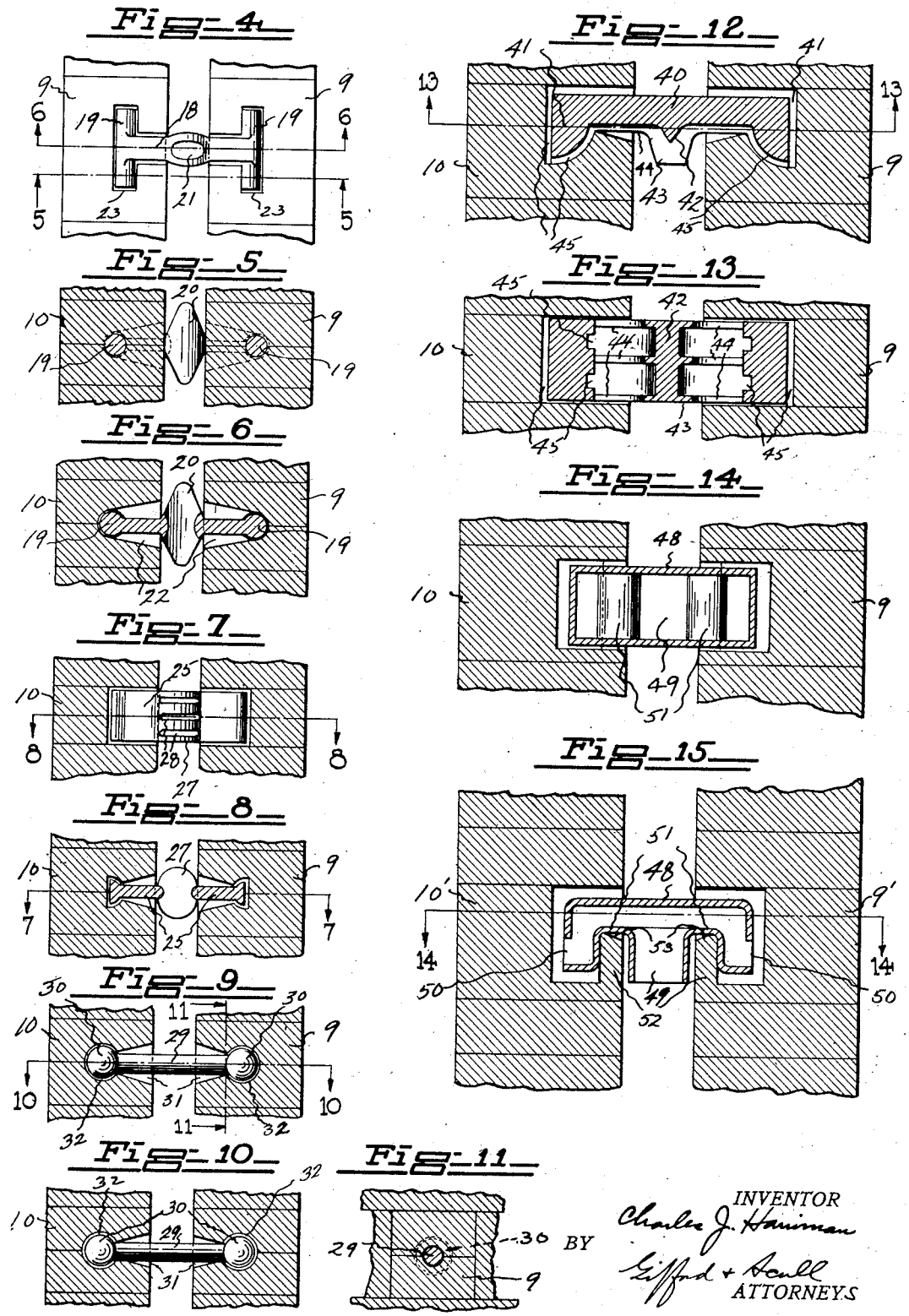

Patented Apr. 23, 1929.

1,710,257

UNITED STATES PATENT OFFICE.

CHARLES J. HANIMAN, OF BAYONNE, NEW JERSEY, ASSIGNOR, BY MESNE ASSIGNMENTS, TO FULLER LEHIGH COMPANY, A CORPORATION OF DELAWARE.

TIE MEMBER FOR FURNACE WALLS.

Application filed July 29, 1925. Serial No. 46,709.

My invention relates to furnace walls that are provided with passages or spaces for the purpose of passing cooling air therethrough. The portions of the walls defining the air passages need to be held in proper relative positions with respect to each other, and in view of the fact that the inner wall next to the furnace is subjected to higher temperature, it expands and contracts more than the outer wall, thus causing relative movement between the two.

My invention will be understood from the description in connection with the drawings, in which like reference characters refer to like parts.

Figure 1 is a vertical section through the furnace showing the tie pieces; Fig. 2 is a similar section on a larger scale, partly broken away; Fig. 3 is a horizontal section through one side of the wall, partly broken away; Fig. 4 is a plan view showing a modification of the tile member; Fig. 5 is a section along the line 5—5 of Fig. 4; Fig. 6 is a section along the line 6—6 of Fig. 4; Fig. 7 is a plan view of a second modification; Fig. 8 is a section along the line 8—8 of Fig. 7; Fig. 9 is a plan view of a third modification; Fig. 10 is a section along the line 10—10 of Fig. 9; Fig. 11 is a section along the line 11—11 of Fig. 9; Fig. 12 is a vertical section of a fourth modification; Fig. 13 is a section along the line 13—13 of Fig. 12; Fig. 14 is a sectional plan of a fifth modification, taken along the line 14—14 of Fig. 15 and Fig. 15 is a sectional elevation of this modification. In the drawings, reference character 1 indicates the inner wall of a furnace of the usual type, in which a grate 2 is installed. The sides of the walls of the furnace are provided with air inlets 3 near the bottom of the walls for the inlet of air below the grate 2. The inner walls 1 of the furnace are surrounded by outer side walls 4 and a top wall 5 spaced a short distance from the walls 1, thus affording passages for air, preferably from the rear at the top through the inlet I, forwardly along the top and down the sides of the walls and under the grate, as indicated by the arrows.

The walls 1 and 4 are provided with special tile 9 and 10, respectively, in which the tie pieces, preferably of metal or other heat-resisting material, between the walls are installed. The tie piece 12 is enlarged near its central portion for strength and also to afford greater surface area for cooling purposes. The tie piece 12 is of practically the same width from one end to the other, as shown in Fig. 3, and its ends are enlarged into rounded portions, as shown at 13. Pairs of tiles 9 and 10 are recessed along their contacting faces, as shown at 14, to provide seats for the enlarged ends 13 of the tie pieces, and these tiles are beveled, as shown at 15, on the side facing the air passage, so that when one of the walls moves vertically with respect to the other, the tie pieces 12 are caused to turn, as indicated in dotted lines in Fig. 2, and the shanks thereof will not bind or break off the corners of the tiles. This construction provides facing recesses with enlarged bottoms and widened mouths, whereby the shank of a tie piece extending through the mouth may have free movement, as just mentioned above.

In the modification shown in Figs. 4, 5 and 6, the tie piece 18 is provided at its ends with elongated transverse portions 19, which are circular in cross section. The central portion of the tie piece which extends across the air passage between the walls is extended in a vertical plane, as shown at 20, and a hole or air passage 21 extends therethrough so as to provide effective cooling surfaces of considerable area. The tile 9 and 10 are beveled, as shown at 22, to provide V-shaped openings, and the rear ends of these openings are extended laterally, as shown at 23 (Fig. 4) to accommodate the enlarged ends 19 of the tie pieces.

In the modification shown in Figs. 7 and 8, the tie piece 25 is of substantially the same width from end to end. Its ends terminate in enlargements that are substantially semicircular in cross section, and its central portion is extended in a vertical plane, as shown at 27, and through this portion air passages 28 are provided.

In the modification shown in Figs. 9, 10 and 11, the tie piece 29 is in the form of a round rod, whose ends terminate in spheres 30. Conical openings 31 are provided in the tile 9 and 10 and spherical openings 32 are provided for the spherical ends 30. It will be observed that in this modification the walls can move in all directions relative to each other, but will be maintained at predetermined distances apart.

In the modification shown in Figs. 12 and 13, the tie piece 40 has its ends terminating in enlarged portions that are somewhat quadrant shaped in cross section. The tie piece 40 is provided on its bottom side in the air space between the walls with transverse V-shaped projections 42, and on each side of the projections 42 are provided projections 43 of greater length than the projections 42. Flanges 44 in the same planes as the projections 43 provide guide channels 45 for air. In this modification, the air impinging against the bottom side of the tie piece will be diverted in opposite directions and will pass along the channels on the lower side of the tie piece into the spaces between the ends of the tie piece and the holes or recesses in the walls 9 and 10 provided to receive the tie pieces, thus effectively cooling the tie pieces.

In the modification shown in Figs. 14 and 15, the tie piece 48 is of substantially the same width from one end to the other, and is made hollow with a rectangularly shaped opening 49 on the lower side thereof in the space between the walls, and with openings 50 at the ends thereof into the recesses provided in the tiles for receiving the ends of the tie pieces. The tie piece 48 is provided with two channels 51 which fit over projections 52 formed on the tiles 9′ and 10′, these projections being beveled, as shown at 53. In this modification the air passing upwardly between the walls will enter the opening 49 and divide into opposite portions and pass out through the openings 50 into the spaces in the tiles which are made somewhat larger than the ends of the tie piece 48, thus effectively cooling the tie piece.

In the modification of the tie pieces that are substantially of the same width from one end to the other, and are provided with enlarged ends which seat into corresponding recesses in the tiles, it is possible to make these recesses somewhat larger than the enlarged ends of the tie pieces, thus providing for a slight amount of longitudinal movement between the walls, the relative vertical movement between the walls being provided by beveling the tiles, as already described.

I claim:

1. In a furnace, inner and outer walls, and a tie piece holding said walls together and having enlarged ends in rocking engagement therewith.

2. In a furnace, inner and outer walls, and a tie piece holding said walls together and having enlarged ends received in recesses in said walls and having rocking engagement therewith.

3. In a furnace, inner and outer walls, a tie piece holding said walls together and having enlarged ends provided with curved surfaces engaging corresponding curved surfaces on said walls, whereby said piece may rock as one wall moves with respect to the other.

4. In a furnace, inner and outer walls having horizontally disposed recesses therein, and a tie piece having ends received within said recesses and in rocking engagement with the walls of the recesses.

5. In a furnace, inner and outer walls having recesses facing each other, each of said recesses having an enlarged bottom and a widened mouth, and a tie piece having enlarged ends received within said enlarged bottoms and a shank passing through said mouths, whereby the tie piece may rock as one wall moves with respect to the other.

6. In a furnace, inner and outer walls spaced apart to permit the passage of air therebetween, and tie pieces holding said walls together and having openings between the walls to permit said air to pass therethrough.

7. In a furnace, inner and outer walls spaced apart to permit the passage of air therebetween, and tie pieces holding said walls together, each piece having means disposed between the walls to direct said air into contact with a relatively large portion thereof.

CHARLES J. HANIMAN.